United States Patent [19]
Acker

[11] Patent Number: 5,581,850
[45] Date of Patent: Dec. 10, 1996

[54] FASTENING DEVICE

[76] Inventor: John D. Acker, 755 Allen, Clarkston, Mich. 48348

[21] Appl. No.: 406,690

[22] Filed: Mar. 20, 1995

[51] Int. Cl.⁶ .................................................. F16L 3/00
[52] U.S. Cl. ........................... 24/16 PB; 24/30.5 P
[58] Field of Search ........................... 24/16 PB, 16 R, 24/30.5 P, 30.5 R, 17 AP; 248/74.3

[56] References Cited

U.S. PATENT DOCUMENTS

| | | | |
|---|---|---|---|
| 3,255,501 | 6/1966 | Laguerre | 24/16 PB |
| 3,438,095 | 4/1969 | Evans | 24/16 PB |
| 4,466,159 | 8/1984 | Burrage | 24/16 PB |
| 4,817,837 | 4/1989 | Grover | 24/16 PB X |
| 5,027,478 | 7/1991 | Suhr . | |
| 5,075,933 | 12/1991 | Kemper . | |
| 5,075,934 | 12/1991 | Osedo . | |
| 5,167,050 | 12/1992 | Korsen . | |
| 5,189,761 | 3/1993 | Chisholm . | |
| 5,396,684 | 3/1995 | Yocum | 24/16 B |

FOREIGN PATENT DOCUMENTS

| | | | |
|---|---|---|---|
| 230292 | 5/1958 | Australia | 24/16 PB |
| 209245 | 5/1960 | Austria | 24/16 PB |
| 1288128 | 2/1961 | France | 24/16 PB |
| 1309873 | 9/1961 | France | 24/16 PB |
| 753420 | 10/1951 | Germany | 24/16 PB |
| 2012300 | 9/1971 | Germany | 24/16 PB |
| 259578 | 6/1949 | Switzerland | 24/16 PB |
| 360840 | 4/1962 | Switzerland | 24/16 PB |

*Primary Examiner*—James R. Brittain
*Attorney, Agent, or Firm*—Harpman & Harpman

[57] ABSTRACT

A flexible elongated loop fastening device for attaching to and securing multiple cords in bundle configurations to itself. The loop fastening device includes a notched and apertured band that is first looped around the cord element to be secured by passing through itself then extending about the remaining coil cord elements and pass through itself again securing same.

6 Claims, 2 Drawing Sheets

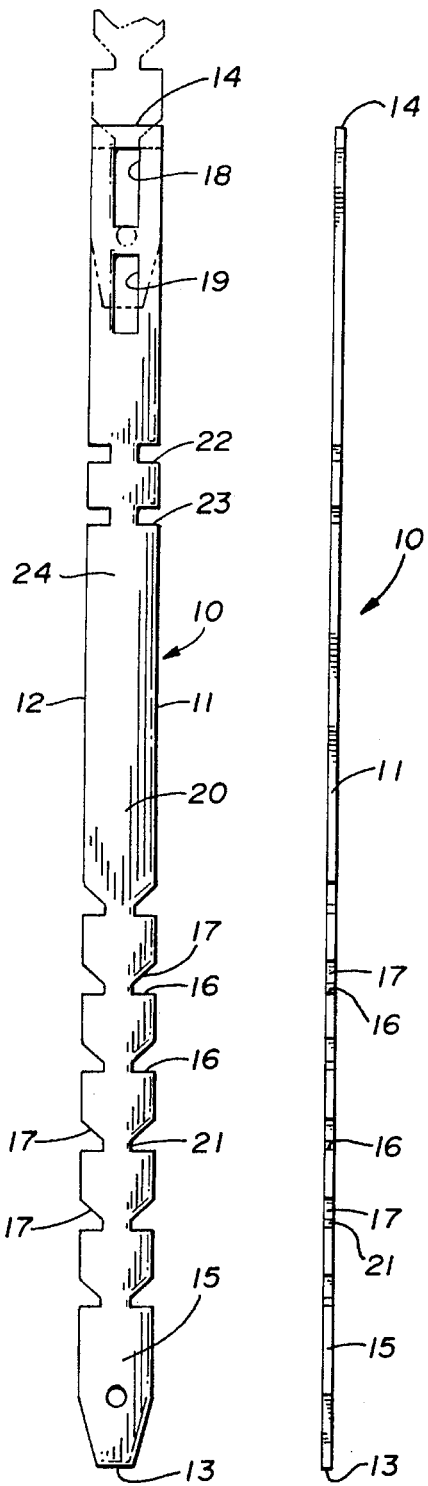
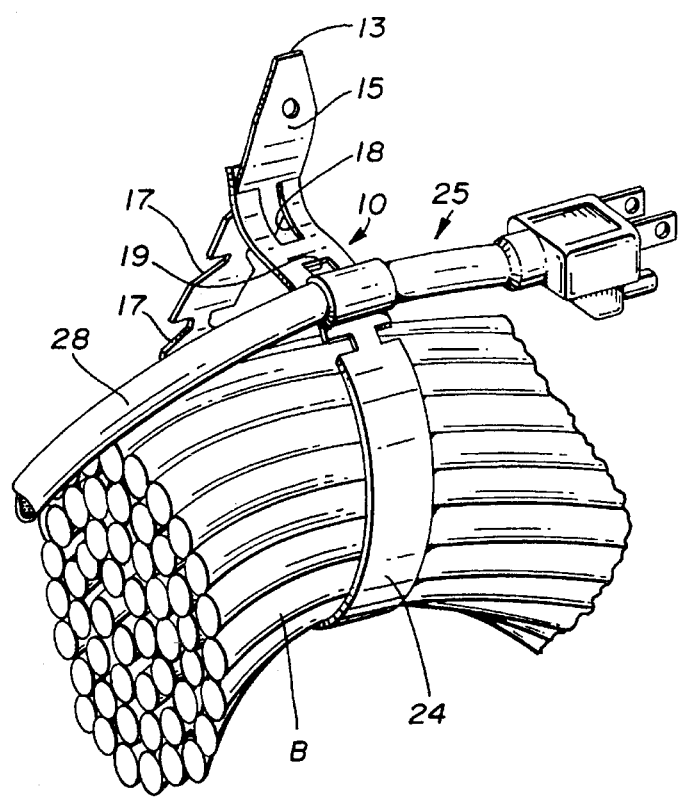
FIG. 1
FIG. 2  FIG. 3

FASTENING DEVICE

BACKGROUND OF THE INVENTION

1. Technical Field

This device relates to fastening straps and clips to secure and bundle cables, hoses, and cords together in a looped coiled configuration for transportation and interim storage.

2. Description of Prior Art

Prior art devices of this type have relied on a variety of different strap and loop configurations to be positioned around and about coils of material to be gathered together, see for example U.S. Pat. Nos. 5,189,761, 5,167,050, 5,075,934, 5,075,933 and 5,027,478.

In U.S. Pat. No. 5,189,761 a strap for collecting and transporting milk containers is disclosed having a plurality of oppositely disposed notches within on adjacent ends and a single slot therebetween.

U.S. Pat. No. 5,167,050 discloses a bundling device for securing cords and the like comprising a strap having a clasp on one end and a hook on the other end thereof with a tongue extending from the center portion of the strap. The strap is covered with hook and loop material on its respective sides so as to be overlapped upon itself for securing same.

U.S. Pat. No. 5,075,934 is directed to a fastening device having a two-part strap with a intermediate strap engageable thereon with respective hook material side and a loop material mating side for use as a single strap bundle or as a pair of independent strap fasteners.

A cable locking and retaining device can be seen in U.S. Pat. No. 5,075,933 having a one-piece strap covered with loop and hook material on oppositely disposed sides with a ring on one end and a flap element extending from the strap portion adjacent its ring.

U.S. Pat. No. 5,027,478 claims a coiling clamp for linear flexible material having a central body member with a plurality of annularly spaced contoured openings within to accept cordlike material.

SUMMARY OF THE INVENTION

The present invention provides a fastening device for bundling cord material into coils for storage and transportation. The fastening device is comprised of an elongated flexible strap having opposite ends that can be interengaged through one another to form a pair of concentric loops of different sizes to be engageable onto and around cord segments. Multiple slots and selective notches are formed within the strap for interengagement locking of the selective loop about the cord to be retained.

DESCRIPTION OF THE DRAWINGS

FIG. 1 is a perspective view of the fastening device engaging a bundle of cords;

FIG. 2 is an enlarged top plan view of the fastening device;

FIG. 3 is a side elevational view of the fastening device;

DESCRIPTION OF THE PREFERRED EMBODIMENT

Figure 5:
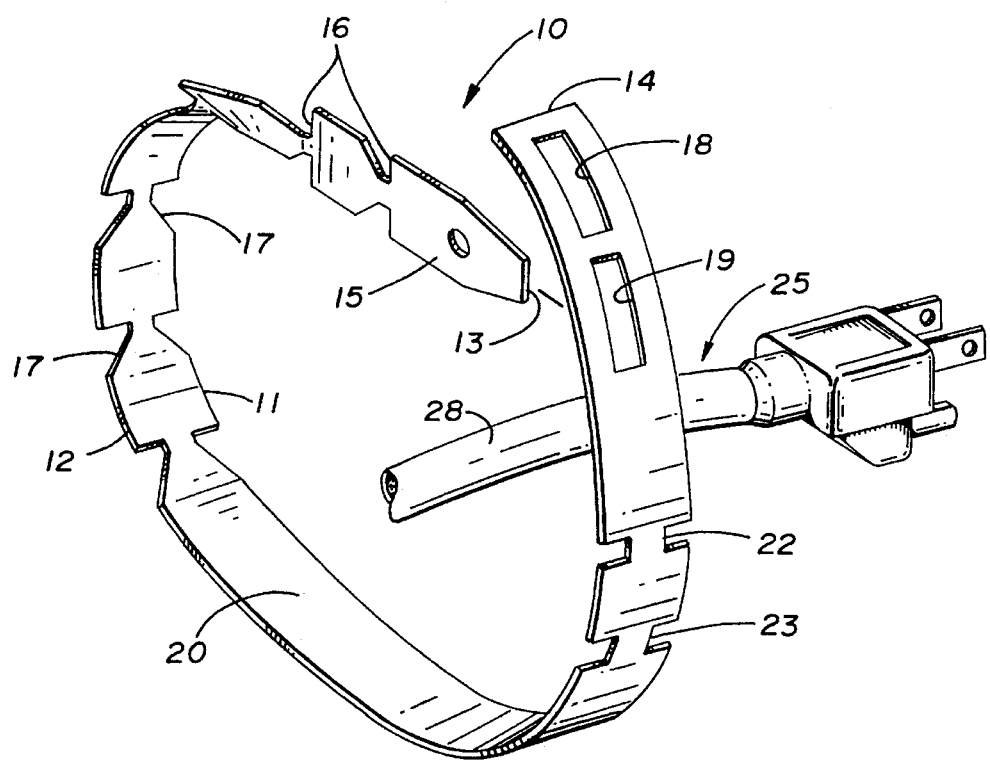
FIG. 5 is a perspective view of the fastening device positioned to be engaged about a cord segment.

Referring to FIGS. 2, 3 and 5 of the drawings, a fastening strap 10 is of a generally elongated flat configuration having oppositely disposed parallel sides 11 and 12 and respective end portions 13 and 14. The first end 13 defines a tapered tongue portion 15 and is apertured inwardly from its end thereof. A plurality of longitudinally spaced notches 16 in the respective sides 11 and 12 extend inwardly from the tongue portion 15 to a point adjacent the midway portion between the respective ends 13 and 14.

The notches 16 each have an angularly disposed shoulder 17 that extends away from said tongue portion.

A pair of elongated slots 18 and 19 extend in longitudinal alignment inwardly from the end 14 and are of a size to allow passage registration of the tapered tongue portion 15 therethrough. The fastening strap has a maximum transverse width at 20 between the respective ends 13 and 14 and a minimum transverse width at 21 as defined between the notches 16 hereinbefore described. Pair of oppositely disposed loop locking notches 22 and 23 are formed within the fastening strap 10 inwardly from the elongated slot 19 and have spaced parallel shoulders therein. The fastening strap minimum width at 21 is delineated between the respective notches of the notches pairs 22 and 23 which is equal to the transverse dimension of the slots 18 and 19 so as to be registerable within as will be described in greater detail later. A medial section 24 of the fastening strap 10 is of a continuous non-interrupted surface between the respective notches 16 and the loop locking notches 22 and 23.

The fastening strap 10 is formed of a flexible resilient synthetic resin rubber-like material which allows for elasticity required in the use to secure an extension cord 25 as best see in FIG. 1 of the drawings.

Figure 4:
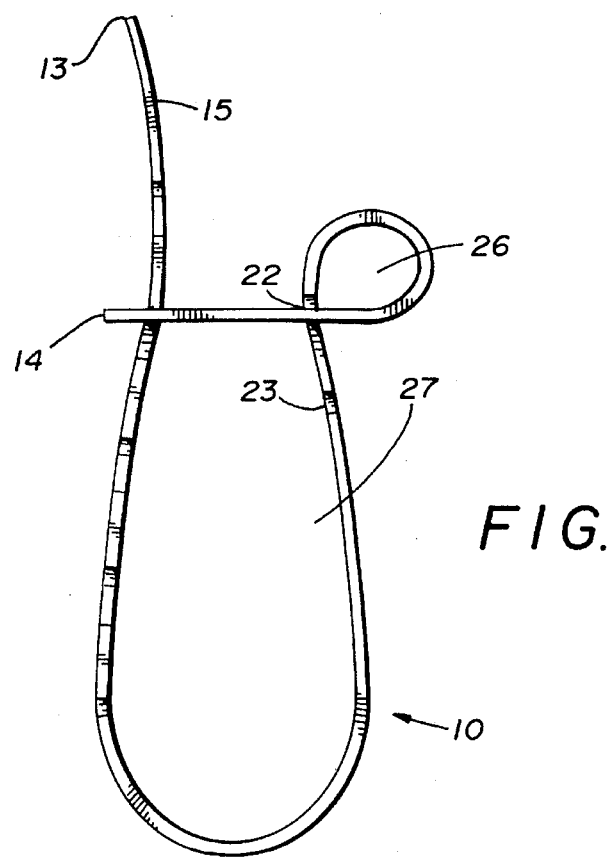
FIG. 4 is a side elevational view of the fastening device in looped configuration.

Referring now to FIGS. 1, 4, and 5 of the drawings, the fastening strap 10 of the invention can be seen in use wherein two engagement strap loops 26 and 27 are formed respectively by initial insertion of the tapered tongue portion 15 through the elongated slot 19 defining the loop 24 about the end portion 28 of the extension cord 25. The fastening strap 10 is progressively advanced through the elongated slot 19 tightening the loop 26 about the end portion 28 of the extension cord 25 and securing by registration engagement of the selective pair of loop locking notches 21 in the elongated slot 19.

The medial section 24 of the fastening strap is then wrapped around the remaining coiled portions of the extension cord 25 defining a cord bundle B within the second strap loop 27 as best seen in FIG. 1 of the drawings.

The tapered tongue portion 15 is then passed through the remaining elongated slot 18 adjacent the first slot 19 and advanced therethrough tightening the strap loop 27 about the extension cord's bundle B. As the fastening strap 10 is advanced through the strap slot 18 the hereinbefore described notches 16 register within the strap slot 18 removably securing the strap loop about the extension cord bundle B as best seen in FIG. 1 of the drawings and illustrated without the extension cords within in FIG. 4.

As it can be seen in FIGS. 4 and 5 of the drawings, the relative dimension of the strap loop 26 about the cord is adjustable by the selective engagement of the respective notch pairs 16 to accommodate cord diameter variations as needed.

It will be evident from the above description that two or more strap fastening devices 10 of the invention can be combined together in end to end relationship to form an enlarged embodiment as a single strap fastener generally illustrated in broken lines in FIG. 2 of the drawings.

Thus it will be seen that a new and useful fastening strap has been illustrated and described and that it will be apparent to those skilled in the art that various changes and modifications may be made therein without departing from the spirit of the invention, therefore I claim:

1. A fastening strap for bundling objects comprising an elongated flexible strap having a first and a second end-and intermediate medial portion, said first and defining a tapered tongue portion apertured inwardly therein, a plurality of tapered notches within opposing sides of said strap extending from said tongue portion, said tapered notches having angularly disposed shoulders extending away from said tapered tongue towards said medial portion, said second end having a pair of longitudinally aligned slots within, said longitudinally aligned slots having a length longer than their width, additional pairs of notches of rectangular shape in said strap between said aligned slots and the medial portion of said strap, said additional pairs of notches defining a strap width therebetween of a transverse dimension less than that of each said slot, said additional pairs of notches in spaced relation to said aligned slots, wherein said first end's tapered tongue portion is registerable through one of said elongated aligned slots closest said additional notched pairs defining a fixed first notchless engagement loop of a finite length equal to said distance between said additional pairs of notches and said elongated aligned slot engaged.

2. The fastening strap of claim 1 wherein said tapered notches define longitudinally spaced opposing notched pairs within said strap's respective sides in spaced relation from said additional pairs of notches defining said medial portion therebetween.

3. The fastening strap of 2 wherein said first end's tongue portion is registerable through said remaining elongated slot wherein said medial portion defines a second engagement loop opposite and extending from said first engagement loop.

4. The fastening strap of claim 3 wherein said remaining aligned slot is registerable with selective tapered notches extending from said tapered tongue defining said second engagement loop.

5. The fastening strap of claim 1 wherein said first end's tongue portion is of an overall width less than said length of one of the aligned slots so as to be registerable therethrough.

6. The fastening strap of claim 1 wherein said fastening strap is of a flexible resilient synthetic resin material.

* * * * *